UNITED STATES PATENT OFFICE.

JAMES M. HERRON, OF EAST ORANGE, NEW JERSEY.

PROCESS OF PRODUCING COFFEE PREPARATIONS.

No. 893,074.   Specification of Letters Patent.   Patented July 14, 1908.

Application filed February 5, 1906. Serial No. 299,632.

*To all whom it may concern:*

Be it known that I, JAMES M. HERRON, a citizen of the United States, and a resident of East Orange, in the county of Essex and State of New Jersey, have invented certain new and useful Improvements in Processes of Producing Coffee Preparations; and in order that those skilled in the art to which my invention pertains may understand, make, and use the same I give the following specification thereof.

My invention relates to improvements in coffee and coffee preparations, and has for its object to provide an improved coffee, in which the harsh, astringent and injurious or objectionable constituents associated with coffee and which renders its use objectionable to some are neutralized and overcome while at the same time the flavor and aroma of the coffee are preserved.

A further object is to produce a coffee preparation having the flavor and aroma of the coffee but without its objectionable features in a form suitable for admixture with caterers', confectioners' and pastry-makers' products, and which may readily be dissolved in water or reduced to a fluid condition or paste by the application of moderate heat.

It is generally conceded that coffee, as ordinarily obtained on the market, has associated with it certain harsh-flavored and bitter constituents which render its use objectionable to many, which impair its digestibility, and which have, more or less, injurious effects upon the human system. These objectionable characteristics of coffee prevent many from enjoying the beneficial and pleasant effects resulting from its use.

My invention is directed not only to neutralizing and overcoming the objectionable and deleterious effects of coffee, and to impart thereto greater digestibility and to improve its flavor, but also to produce a coffee preparation having all the good qualities of the improved coffee in a form convenient for use and sale and readily reducible to a fluid or solution which may be readily and thoroughly incorporated with articles of food, such as pastry, confectionery, ice cream etc., for imparting thereto the characteristics and flavor of coffee.

In carrying out my invention, I take roasted coffee, either whole or ground, and mix the same in substantially equal quantities with cocoa beans or nibs. The respective sizes of the coffee grains or berries, and the cocoa nibs, or beans should be so chosen as to readily admit of their subsequent separation one from the other. To this end the coffee may first be ground so that it may be readily sifted out subsequently from the cocoa nibs or beans. If whole coffee berries are employed, then the cocoa beans or nibs should be cracked or otherwise reduced to a small size to admit of their ready subsequent separation from the coffee berries.

In selecting the cocoa beans, I use the raw or unroasted beans, and prefer to use those known as "ripe" beans. By "ripe" cocoa beans, is understood cocoa beans which have undergone a "ripening" or fermenting process. This process, as is well known, imparts certain changes to the cocoa beans, among which are change of color from the ordinary blue color of the bean to a color more resembling manufactured chocolate; and imparting to the beans a more pleasant and agreeable flavor—the blue or natural bean having a more or less bitter and astringent flavor. If desired however, ordinary unroasted cocoa beans may be used.

The roasted coffee and the cocoa nibs or beans having been thoroughly mixed in about equal proportions are placed in a closed receptacle for a period of about forty-eight hours, and subjected for this length of time to a temperature of about 110° F. The length of time and the temperature at which this step of the process is carried on may be somewhat greater or less than that specified, but should be for such length of time and at such temperature that the best results are obtained. This can be determined by experiment, and may vary for different kinds of cocoa and coffee beans. After this treatment has progressed for the requisite length of time, the mixture is removed from the receptacle and sifted or otherwise treated to thoroughly separate the coffee from the cocoa beans or nibs. The coffee thus obtained may be used in the ordinary way for making the beverage. The resulting coffee will be found to have absorbed from the cocoa beans and to have imparted to it many beneficial qualities, such as greater digestibility, improved flavor, with a neutralization of the harsh, astringent and deleterious properties which the original coffee possessed. The cocoa nibs or beans thus obtained, separated from the coffee, are then ground to a paste, preferably at a slightly elevated temperature. The fluid paste so obtained may be run into molds and allowed to harden to form tablets or cakes. This product possesses the full flavor and aroma of the coffee and is readily reducible to a fluid by the application of heat in which condition it is readily and thoroughly incorporated with articles of foods to be flavored, iced, or coated with coffee. Or the cakes or tablets may be dissolved in hot or boiling water and produce a clear solution without appreciable sediment or residue. The cakes or tablets so produced retain their hardness and solidity under ordinary conditions of summer temperature and may be stored or shipped without danger of softening or melting, but are readily reducible to fluid condition for use by the application of moderate heat.

Having thus described my invention, what I claim as my invention and desire to protect by Letters Patent is:

1. The process of producing an improved coffee preparation, which consists in mixing together roasted coffee and raw cocoa beans or nibs, subjecting said mixture to heat in a closed receptacle, and then separating the coffee from the cocoa beans or nibs.

2. The process of producing an improved coffee preparation, which consists in mixing together roasted coffee and raw cocoa beans or nibs, heating the mixture in a closed receptacle for a period of approximately forty eight hours at a temperature of approximately 110° F., and then separating the coffee from the cocoa beans or nibs.

3. The process of producing an improved coffee preparation, which consists in mixing together ground roasted coffee and raw ripe cocoa nibs or beans, subjecting the mixture to heat in a closed receptacle for a period of forty eight hours at a temperature of 110° F., separating the coffee from the cocoa nibs or beans, and then grinding said beans or nibs.

JAMES M. HERRON.

Witnesses:
ASHLEY M. HERRON.
WILLIAM P. HAMMOND.